United States Patent [19]

Vitat et al.

[11] 4,161,450

[45] Jul. 17, 1979

[54] DRYING COMPOSITIONS

[75] Inventors: Jean-Claude Vitat, Antony; Jean-Pierre Rémond, Massy; Jean-Robert Thebault, Paris, all of France

[73] Assignee: Rhone-Poulenc Industries, Paris, France

[21] Appl. No.: 777,849

[22] Filed: Mar. 15, 1977

[30] Foreign Application Priority Data

Jun. 4, 1976 [FR] France .................................. 76 16961

[51] Int. Cl.² .............................................. C09K 3/00
[52] U.S. Cl. ........................................... 252/194; 34/9
[58] Field of Search .............................. 252/194, 364; 148/6.14 R; 134/3, 41; 422/12; 34/9

[56] References Cited

U.S. PATENT DOCUMENTS

| 3,653,983 | 4/1972 | Ziehr et al. ......................... 252/194 |
| 3,903,012 | 9/1975 | Brandreth ............................ 252/194 |

FOREIGN PATENT DOCUMENTS

| 2040733 | 9/1970 | France ................................... 252/194 |
| 2205562 | 6/1972 | France ................................... 252/194 |

Primary Examiner—Benjamin R. Padgett
Assistant Examiner—J. L. Barr
Attorney, Agent, or Firm—McDougall, Hersh & Scott

[57] ABSTRACT

A composition for drying surfaces comprising 90 to 99.95% by weight of an organic solvent at least 50% of which is 1,1,2-trichloro-1,2,2-trifluoroethane, 0.04 to 8% by weight of a hydrophobic substantially water insoluble surface active agent and 0.01 to 2% by weight of an organic acid.

6 Claims, No Drawings

DRYING COMPOSITIONS

The present invention relates to compositions based on trichlorotrifluoroethane and their application to treatment of surfaces.

It is known to treat surfaces to eliminate water which is retained thereon by putting said surfaces in contact with liquid compositions formed essentially of trichlorotrifluoroethane and a small quantity of a surface active agent, which is generally cationic and insoluble or only sparingly soluble in water and contributes to the displacement of water from the surface of the articles.

Among these compositions, reference may be made to French Pat. Nos. 2,040,733 and 2,205,562.

These compositions give satisfactory results for treatment of articles. However, these compositions may have the disadvantage of forming a stable emulsion with water eliminated from the articles during their use, either following introduction into the drying composition of chemical contaminants present on the articles to be dried or because of mechanical action on the compositions in use.

It has now been found that such disadvantages may be avoided by addition of small quantities of certain organic acids to said compositions.

According to one aspect of the invention, there is provided a composition comprising from 90 to 99.95% by weight of an organic solvent containing at least 50% by weight of 1,1,2-trichloro-1,2,2-trifluoro-ethane, from 0.04% to 8% by weight of a hydrophobic surface active agent substantially insoluble in water, and from 0.01 to 2% by weight of an organic acid selected from the saturated aliphatic mono- or diacids having a $C_5$–$C_{10}$ chain and which are linear, branched or cyclic and substituted or unsubstituted; aliphatic unsaturated mono- or diacids which have a $C_5$–$C_{30}$ chain and are linear or branched and substituted or unsubstituted; and aromatic acids having a $C_7$–$C_9$ saturated or unsaturated chain, which are unsubstituted or mono- or polysubstituted by at least one amino, nitro, hydroxy or methoxy group.

Preferred compositions contain 98 to 99.85% by weight of the solvent containing at least 50% by weight of 1,1,2-trichloro-1,2,2-trifluoro-ethane, from 1 to 0.1% by weight of the hydrophobic surface active agent and 1 to 0.05% by weight of the acid.

Representative of the acids which may be used in the compositions embodying the features of this invention include valeric, caproic, enanthic, caprylic, pimelic, suberic, azelaic or sebacic acids; oleic, linoleic, undecylenic, ricinoleic acids; cyclohexane monocarboxylic, 1,2- or 1,4-trans cyclohexane dicarboxylic acids; benzoic, ortho or para hydroxybenzoic, anthranilic, 3 or 5 nitro salicyclic, orthotoluic and cinnamic acids.

The liquid containing at least 30% by weight of 1,1,2-trichloro-1,2,2-trifluoro-ethane may also contain aliphatic hydrocarbons such as hexane; aliphatic fractions such as white spirit, kerosene; halogenated aliphatic hydrocarbons such as chloroform, methylene chloride, dichloroethanes, trichloroethanes, tetrachloro-1,1,2,2-ethane, tetrachloro- 1,1,2,2-difluoro-1,2-ethane, perchlorethylene, trichloroethylene and aromatic hydrocarbons such as xylene.

Among the surface active agents which are hydrophobic and substantially insoluble in water there may be mentioned: salts in the compositions which are the subject of French Pat. No. 2,040,733; these salts are salts of diamines of formula R—NH $(CH_2)_n$—$NH_2$ where R represents a $C_1$–$C_{25}$ saturated or unsaturated aliphatic group and n represents a whole number from 1 to 9, with one or more $C_{10}$–$C_{30}$ aliphatic acids containing at least one ethylenic double bond; examples of these salts are dioleate of oleylaminopropylene amine, oleylaminopropylene amine di-undecylenate, stearylaminopropylene amine dioleate, palmitylaminopropylene amine dioleate and oleylaminopropylene amine dilinoleate; the diamides mentioned in the compositions which are the subject of French Pat. No. 2,205,562 and having the formula

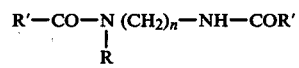

where R represents a saturated or unsaturated aliphatic $C_1$–$C_{25}$ hydrocarbon residue, R' represents a $C_{10}$–$C_{30}$ aliphatic hydrocarbon group containing at least one ethylenic double bond and n represents a whole number from 1 to 9; examples of the diamides are dioleyl-oleyl amido propylene amide, diundecylenyloleylamidopropylene amide, dioleyl-stearylamidopropylene amide, dioleyl-palmitylamido propylene amide and dilinoleyl-oleylamidopropylene amide.

The compositions of the invention may be prepared by mixing the three principal constituents in any order.

The compositions embodying the practice of this invention may be used for treating surfaces in order to eliminate water present thereon. The presence of the organic acids mentioned above favors decantation of the water avoiding formation of stable emulsions when the compositions are mixed intimately with water by means of a pump, turbine, etc.

The compositions of the invention are especially useful for treating metal surfaces, such as surfaces of ferrous metals, stainless steel, nickel and its alloys, chromium and its alloys, copper, brass, bronzes, cadmium, metal compositions vased on silver, gold, platinum, titanium, silicon and germanium; plastics materials which are not attacked by the compositions, such as polyamides, polytetrafluoroethylene; copolymers of hexafluoropropylene and vinylidene fluorides; polyolefins, chlorosulphonated polyolefins, vinylic polymers and copolymers, polymers and copolymers of vinyl chloride and/or fluoride, polyesters, polycarbonates, polymethacrylates, copolymers of acrylonitrile-butadiene and styrene, copolymers of butadieneacrylonitrile and butadiene-styrene, polychloro-butadiene and resins based on urea and formaldehyde; glass surfaces and refractory materials such as alumina, silica and/or magnesia, and precious stones.

By reason of their excellent properties, the compositions of the invention are more especially recommended for drying of cinema films, printed circuits, electronic components, precision instruments such as microscopes, balances and control apparatus, electric motors, optical glasses and gold and silver articles.

Treatment of said surfaces to remove water may be carried out by putting said surfaces in contact with the compositions of the invention, for example by spraying, application with a brush, sprinkling or by immersion of said surfaces in the liquid compositions.

In the latter case it is useful to agitate the liquid bath. Agitation of the liquid bath may be carried out by any convenient means, preferably by means of ultrasonics and/or by simple heating to boiling.

The water removed from the treated surfaces is extracted in droplets which rapidly form themselves or collect into a layer which is easy to decant. Washing of the treated surfaces with an appropriate solvent, for example 1,1,2-trichloro 1,2,2-trifluoroethane, allows elimination of traces of the surface active agents and organic acids which may persist on the treated surfaces. Finally the solvent may be allowed to evaporate on the surface, leaving the surface dry, that is to say free from water and solvent.

Embodiments of the invention will be described by way of illustration in the following examples.

EXAMPLES 1 TO 5

Trials for Drying of Printed Electronic Circuits

Printed circuits on a support of urea-formaldehyde resin previously degreased in 1,1,2-trichloro-1,2,2-trifluoroethane, are immersed in tap water, then immediately plunged for 3 minutes into a boiling composition consisting of 99.2% 1,1,2-trichloro-1,2,2-trifluoroethane, 0.4% of dioleyloleylamido propylene amide and 0.4% benzoic acid. It is found that in 10 trials there is obtained 100% drying of the printed circuits. Identical results are obtained by compositions shown in Table I below.

TABLE I

| Examples | 2 | 3 | 4 | 5 |
|---|---|---|---|---|
| Trichloro-trifluoro-ethane | 99.2% | 99.3% | 99.3% | 99.6% |
| dioleyl-oleylamidopropylene amide | 0.4% | 0.3% |  | 0.3% |
| oleylaminopropylene amine dioleate |  |  | 0.4% |  |
| benzoic acid |  | 0.2% |  | 0.1% |
| toluic acid | 0.4% |  | 0.3% |  |

The dioleyl-oleylamidopropylene amide and oleylaminopropylene amine dioleate are prepared according to the methods described respectively in French Pat. Nos. 2,205,562 and 2,040,733.

EXAMPLE 6

In a bath of approximately 200 × 150 × 150 mm, there is circulated by continuous recycling by means of a pump, at a rate of about 300 l/h, a mixture at 45° C. formed on the one hand of a composition formed of 99.6% 1,1,2-trichloro-1,2,2-trifluoroethane and 0.4% of dioleyl-oleylamidepropylene amide (total 7 liters), and on the other hand 800 ml of tap water. It is found that after 5 minutes the mixture has a homogeneous appearance. A sample removed at the end of this time has, after three minutes, two phases: a lower organic phase and an upper viscous homogeneous phase formed of an emulsion of the organic phase and the aqueous phase. Appearance of a clear aqueous phase is not observed after 100 hours.

EXAMPLE 7

The operation described in Example 6 is carried out except that the dioleyl-oleylamidopropylene amide is replaced with 0.4% of oleylaminopropylene amide dioleate. Again a clear aqueous phase does not appear after 100 hours.

EXAMPLE 8

0.4% by weight of benzoic acid is added to a mixture described in Example 6. A sample is removed after having circulated the mixture at a rate of 300 l/h for 2 minutes. The sample has, at the end of 30 seconds, an organic phase and a distinctly separated aqueous phase without any trace of emulsion.

EXAMPLE 9

0.4% of benzoic acid is added to the mixture described in Example 7. A sample is removed after having circulated the mixture at a rate of 300 l/h for 2 minutes. The sample has, after 45 seconds, an organic phase and an aqueous phase which completely separated without any trace of emulsion.

EXAMPLE 10

The tests described in Examples 8 and 9 are carried out using different compositions.

The compositions used and the results obtained (decantation time) are shown in the following Table II.

TABLE II

| Examples | 10 | 11 | 12 | 13 | 14 | 15 | 16 | 17 | 18 |
|---|---|---|---|---|---|---|---|---|---|
| Trichlorotrifluoroethane | 99.7% | 98.6% | 99.2% | 99.2% | 99.2% | 99.2% | 99.2% | 99.55% | 99.2% |
| Dioleyl-oleylamidopropylene amide |  | 1% | 0.4% | 0.4% |  |  | 0.4% | 0.4% | 0.4% |
| Oleylaminopropylene amine dioleate | 0.2% |  |  |  | 0.4% | 0.4% |  |  |  |
| Benzoic Acid | 0.1% |  |  |  |  |  |  | 0.05% |  |
| o-Toluic Acid |  | 0.4% |  |  |  |  |  |  |  |
| Caprylic Acid |  |  | 0.4% | 0.1% |  |  |  |  |  |
| Sebacic Acid |  |  |  |  | 0.4% |  |  |  |  |
| Enanthic Acid |  |  |  |  |  | 0.4% |  |  |  |
| Cinnamic Acid |  |  |  |  |  |  | 0.4% |  |  |
| Oleic Acid |  |  |  |  |  |  |  |  | 0.4% |
| Times of decantation | 150 s | 80 s | 70 s | 20 mn | 55 mn | 12 mn | 6 mn | 25 mn | 10 mn |

We claim:

1. A composition comprising from 90 to 99.95% by weight of an organic solvent containing at least 50% by weight of 1,1,2-trichloro-1,2,2-trifluoro-ethane, 0.04% to 8% by weight of a hydrophobic surface active agent substantially insoluble in water, and 0.01% to 2% by weight of an organic acid which voids the formation of stable emulsions, said acid being selected from the group consisting of saturated aliphatic mono- or diacids having a $C_5$–$C_{10}$ chain and which are linear, branched or cyclic and substituted or unsubstituted; aliphatic unsaturated mono- or diacids which have a $C_5$–$C_{30}$ chain and are linear or branched and substituted or unsubstituted; and aromatic acids having a $C_7$–$C_9$ saturated or unsaturated chain, which are unsubstituted or mono- or polysubstituted by at least one amino, nitro, hydroxy or methoxy group.

2. A composition according to claim 1, comprising from 98 to 98.85% by weight of said solvent, 0.1% to 1% by weight of said hydrophobic surface active agent insoluble in water, and 1 to 0.05% by weight of said acid.

3. A composition according to claim 1, in which said organic acid is selected from the group consisting of valeric, caproic, enanthic, caprylic, pimelic, suberic, azelaic, sebacic, oleic, linoleic, undecylenic, ricinoleic, cyclohexane monocarboxylic, 1,2 or 1,4 trans-cyclohexanedicarboxylic, benzoic, ortho or para hydroxybenzoic, anthranilic, 3 or 5 nitrosalicyclic, orthotoluic or cinnamic acid.

4. A composition as claimed in claim 1 in which said surface active agent is selected from the group consisting of a salt of a diamine represented by the formula R—NH (CH$_2$)$_n$—NH$_2$ where R is a C$_1$-C$_{25}$ saturated or unsaturated aliphatic group and n is from 1 to 9 and one or more C$_{10}$-C$_{30}$ aliphatic acid having at least one ethylenic double bond.

5. A composition as claimed in claim 1 in which said surface active agent is a diamide having the formula $$R'-CO-N(R)-(CH_2)_n-NH-COR'$$

where R is a saturated or unsaturated C$_1$-C$_{25}$ aliphatic hydrocarbon group, R' is a C$_{10}$-C$_{30}$ aliphatic hydrocarbon group having at least one ethylenic double bond and n is from 1 to 9.

6. A composition as claimed in claim 1 which comprises from 98.6 to 99.75% by weight of 1,1,2-trichloro-1,2,2-trifluoroethane, from 0.2 to 1% by weight of the surface active agent and from 0.50% to 0.4% by weight of an acid selected from the group consisting of benzoic, orthotoluic, caprylic, sebacic, enanthic, cinnamic or oleic acid.

* * * * *